(12) United States Patent
Tatebe et al.

(10) Patent No.: US 10,401,768 B2
(45) Date of Patent: Sep. 3, 2019

(54) SIGNAL LEVEL, ADJUSTMENT APPARATUS, PHASE DETECTION APPARATUS, MOTOR DRIVE CONTROLLER, CONVEYER, IMAGE FORMING APPARATUS, AND SIGNAL LEVEL ADJUSTMENT METHOD

(71) Applicants: Tetsuroh Tatebe, Hyogo (JP); Tomohiko Kamatani, Osaka (JP)

(72) Inventors: Tetsuroh Tatebe, Hyogo (JP); Tomohiko Kamatani, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 442 days.

(21) Appl. No.: 15/179,348

(22) Filed: Jun. 10, 2016

(65) Prior Publication Data

US 2016/0370746 A1 Dec. 22, 2016

(30) Foreign Application Priority Data

Jun. 18, 2015 (JP) .................................. 2015-123234

(51) Int. Cl.
| | |
|---|---|
| H02P 1/26 | (2006.01) |
| H02P 1/32 | (2006.01) |
| G05B 15/02 | (2006.01) |
| G03G 15/00 | (2006.01) |
| H04B 15/04 | (2006.01) |

(52) U.S. Cl.
CPC ......... *G03G 15/5008* (2013.01); *H04B 15/04* (2013.01)

(58) Field of Classification Search
CPC ..................... H01L 2924/181; H01L 2924/00
See application file for complete search history.

(56) References Cited

U.S. PATENT DOCUMENTS

| | | | | |
|---|---|---|---|---|
| 5,032,928 | A | * | 7/1991 | Sakai ..................... G03G 15/01 358/448 |
| 7,746,023 | B2 | | 6/2010 | Ajima et al. |
| 8,866,421 | B2 | | 10/2014 | Kamatani et al. |
| 8,872,453 | B2 | | 10/2014 | Kamatani et al. |
| 9,294,021 | B2 | | 3/2016 | Murata |
| 2010/0045219 | A1 | * | 2/2010 | Ajima ...................... H02P 6/10 318/400.04 |
| 2013/0099708 | A1 | * | 4/2013 | Shimizu .................. H02P 21/18 318/400.39 |
| 2015/0303846 | A1 | | 10/2015 | Tatebe |

FOREIGN PATENT DOCUMENTS

| | | |
|---|---|---|
| JP | 2007-166735 | 6/2007 |
| JP | 2013-099022 | 5/2013 |
| JP | 2013-099023 | 5/2013 |
| JP | 2015-019563 | 1/2015 |
| JP | 2015-208121 | 11/2015 |

* cited by examiner

*Primary Examiner* — Jorge L Carrasquillo
*Assistant Examiner* — Charles S Laughlin
(74) *Attorney, Agent, or Firm* — Harness, Dickey & Pierce, P.L.C.

(57) ABSTRACT

A signal level adjustment apparatus includes a detector configured to detect both a plurality of peak levels of an input signal having a sinusoidal waveform or a substantially sinusoidal waveform and a plurality of bottom levels of the input signal; and a level adjuster configured to adjust, in a predetermined zone of the input signal, levels of the input signal based on the plurality of peak levels and the plurality of bottom levels detected by the detector.

16 Claims, 12 Drawing Sheets

SIGNAL LEVEL, ADJUSTMENT APPARATUS, PHASE DETECTION APPARATUS, MOTOR DRIVE CONTROLLER, CONVEYER, IMAGE FORMING APPARATUS, AND SIGNAL LEVEL ADJUSTMENT METHOD

BACKGROUND OF THE INVENTION

1. Field of the Invention

The disclosures herein generally relate to a signal level adjustment apparatus, a phase detection apparatus, a motor drive controller, a conveyer, an image forming apparatus, and a signal level adjustment method.

2. Description of the Related Art

In control for a DC motor, a technique for detecting a rotation position of a rotor is known in the related art.

Japanese Unexamined Patent Application Publication No. 2013-99023 discloses a motor drive controller that uses a plurality of sensor signals output in accordance with a rotation phase to detect a rotation position in a case in which a level of the sensor signals reaches a threshold in accordance with a desired rotation phase and in a case in which the level reaches a zero cross point of the sensor signals.

However, in the motor drive controller disclosed in Japanese Unexamined Patent Application Publication No. 2013-99023, an installation phase error in a manufacturing process or a phase error due to magnetization variability (dispersion) may cause an error in a detection phase.

SUMMARY OF THE INVENTION

It is a general object of at least one embodiment of the present disclosure to provide at least one of a signal level adjustment apparatus, a phase detection apparatus, a motor drive controller, a conveyer, an image forming apparatus, and a signal level adjustment method that substantially obviate one or more problems caused by the limitations and disadvantages of the related art.

According to an aspect of the present application, there is a signal level adjustment apparatus including a detector configured to detect both a plurality of peak levels of an input signal having a sinusoidal waveform or a substantially sinusoidal waveform and a plurality of bottom levels of the input signal; and a level adjuster configured to adjust, in a predetermined zone of the input signal, levels of the input signal based on the plurality of peak levels and the plurality of bottom levels detected by the detector.

DESCRIPTION OF THE PREFERRED EMBODIMENTS

In the following, embodiments of the present invention will be described with reference to the accompanying drawings. One object of the present disclosure is to provide a level adjustment apparatus that can improve detection accuracy of a rotation phase of a motor. In the following descriptions and the drawings, same reference numbers are given to elements having substantially same functions and overlapping descriptions may be omitted as appropriate.

First Embodiment

<Example of a Signal Level Adjustment Apparatus 10>

First, an example of a signal level adjustment apparatus 10 according to a first embodiment will be described.

Figure 1:
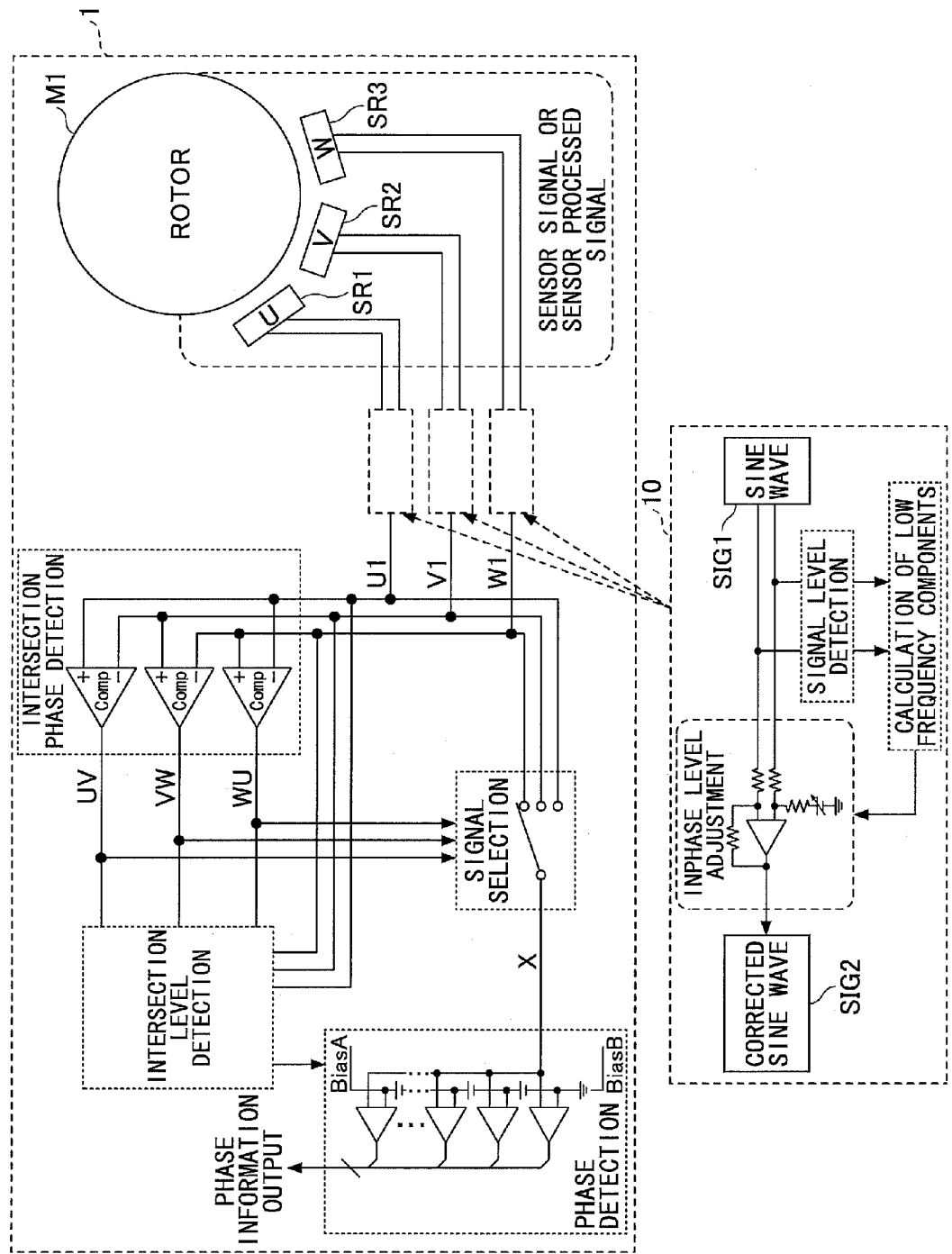
FIG. 1 is a diagram illustrating an example of a configuration of a signal level adjustment apparatus according to a first embodiment of the present disclosure.

FIG. 1 is a diagram illustrating an example of a configuration of the signal level adjustment apparatus 10 according to the first embodiment of the present disclosure. As illustrated in FIG. 1, a motor drive controller 1 according to the first embodiment includes a motor M1. The motor M1 includes a rotor (rotating portion). In order to detect a rotation angle of the rotor, a plurality of magnetic sensors (referred to as "sensors" hereinafter) SR1, SR2, and SR3 (U-phase, V-phase, and W-phase) are arranged around the rotor. In accordance with a change of magnetic flux density of the rotor of the motor M1 including a plurality of coils, the respective sensors SR1 to SR3 output sensor signals that represent phases based on a plurality of signals continuously changing.

In the respective sensors SR1 to SR3, for example, Hall elements or the like may be used. The sensor signals output from the sensors SR1 to SR3, in which the Hall elements are used, are signals of sine waves or waves similar to the sine waves. Further, if the motor M1 is a brushless DC motor, the sensors SR1 to SR3 are arranged, for example, to have an electrical angle of 120° therebetween. It should be noted that output by the Hall elements will be described later.

The motor drive controller 1 includes the signal level adjustment apparatus 10. The signal level adjustment apparatus 10 and the motor drive controller 1 are connected as illustrated in FIG. 1, for example. In this example, the signal level adjustment apparatus 10 inputs, as input signals, sensor signals that the respective sensor SR1 to SR3 output. That is, the input signals are, for example, sine waves SIG1. It should be noted that the input signals may be the sine waves SIG1 or signals similar to the sine waves including frequency components lower than the sine waves SIG1. In other words, each input signal may have a continuous sinusoidal waveform or a substantially continuous sinusoidal waveform. Further, each input signal includes a plurality of cycles. In the following, an example will be described in which the input signals are the sine waves SIG1. Further, the input signal may be sensor processed signals such as signals in which noise included in the sensor signals is attenuated by low pass filters or signals amplified by amplifiers.

The signal level adjustment apparatus 10 adjusts the input signals to output corrected sine waves SIG2. It should be noted that the respective corrected sine waves SIG2 are output from the signal level adjustment apparatus 10 as output signals U1, V1 and W1. Further, the input signals are input regularly or irregularly in accordance with operation of the motor M1.

Further, the motor drive controller 1 includes an intersection phase detector. The intersection phase detector detects intersection points of the output signals U1, V1, and W1. It should be noted that a signal that represents an intersection point of the output signal U1 and the output signal V1 is an intersection detection signal UV. Similarly, a signal that represents an intersection point of the output signal V1 and the output signal W1 is an intersection detection signal VW, and a signal that represents an intersection point of the output signal W1 and the output signal U1 is an intersection detection signal WU.

Further, the motor drive controller 1 includes a signal selector. The signal selector selects, based on the intersection detection signals UV, VW, and WU, any of the output signals U1, V1 and W1 as a selection signal X. Next, the selection signal X is transmitted to a phase detector that the motor drive controller 1 includes.

The phase detector sets a plurality of thresholds in accordance with a rotation position of the motor M1. If the selection signal X transmitted to the phase detector becomes any of the set thresholds, the phase detector outputs phase information that represents that the selection signal X becomes the threshold. It should be noted that a signal Bias A and a signal Bias B in the phase detector are intersection point levels or signals based on intersection point levels.

The signal level adjustment apparatus 10 and the elements illustrated in FIG. 1 may be implemented by an electric circuit, for example. Further, the signal level adjustment apparatus 10 may input signals other than the sensor signals related to the motor M1 as the input signals.

<Example of Detection and Adjustment>

Figure 2:
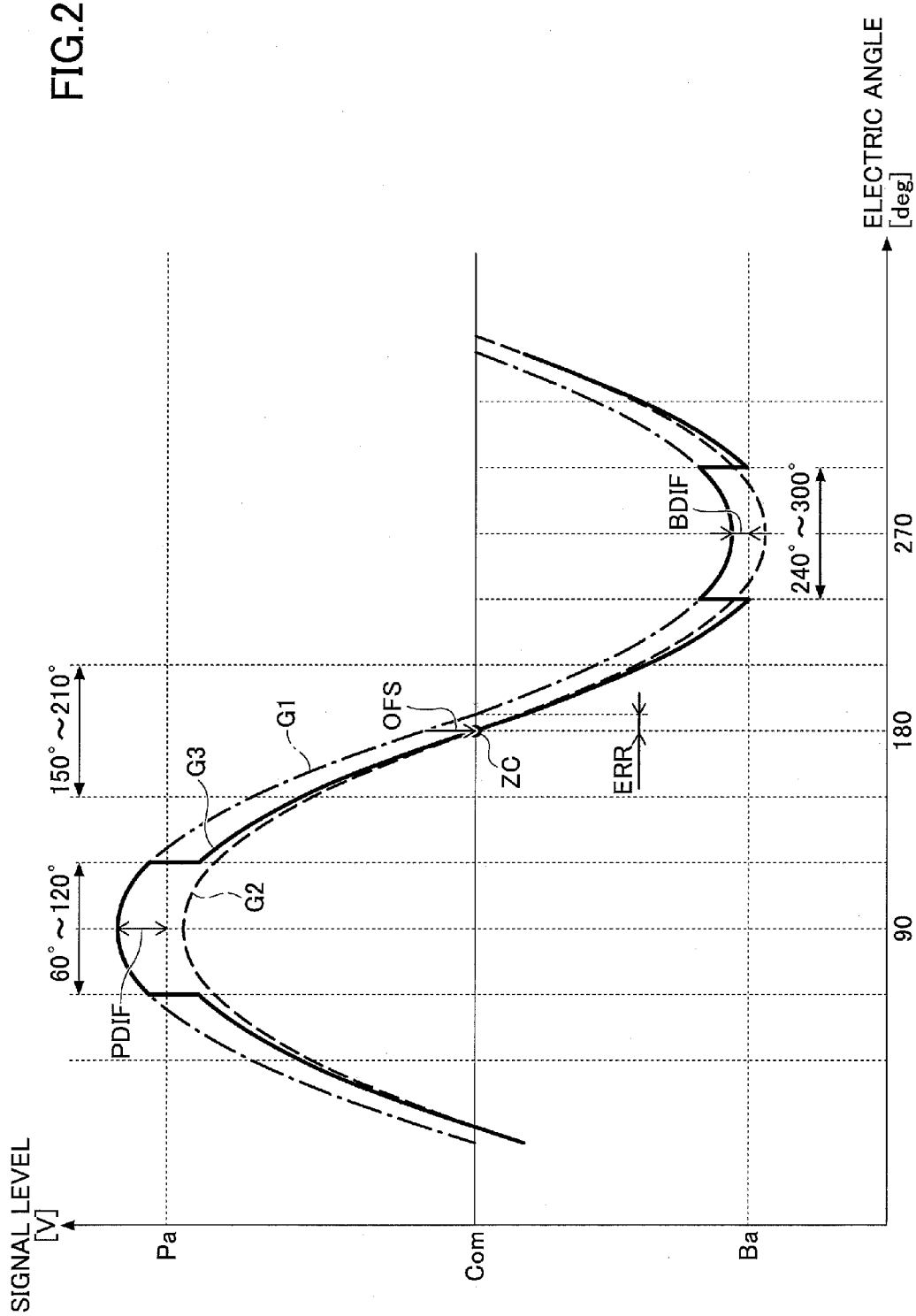
FIG. 2 is a waveform chart illustrating an example of detection and adjustment by the signal level adjustment apparatus according to the first embodiment of the present disclosure.

FIG. 2 is a waveform chart illustrating an example of detection and adjustment by the signal level adjustment apparatus 10 according to the first embodiment of the present disclosure. As illustrated in FIG. 2, a first graph G1 is an example that depicts one cycle of the sine wave SIG1 (FIG. 1) input to the signal level adjustment apparatus 10. In other words, the first graph G1 depicts a part of the input signal including the plurality of cycles (a plurality of peak levels and a plurality of bottom levels). The first graph G1 depicts signal levels that become intersection points of the plurality of signals in accordance with the change of the magnetic flux density (see FIG. 9). On the other hand, a second graph G2 illustrated in FIG. 2 is an example of an ideal sine wave. For example, in a case in which it is intersected at a point where the electric angle becomes 30° with reference to some sensor, the signal level of the intersection point is, in the ideal sine wave, a half of sine wave amplitude (that is, sin 30° times).

Further, a common level COM illustrated in FIG. 2 is a signal level of the ground (GND) or a signal level having an offset that is a predetermined voltage with respect to the ground. That is, an intersection point of the common level Com and each sensor signal is a zero cross point ZC. It should be noted that the offset is a predetermined value or the like.

The signal level adjustment apparatus 10 performs an in-phase level adjustment on the input signal, which is the signal represented by the first graph G1, to generate and output the corrected sine wave SIG2 (FIG. 1). In other words, the signal level adjustment apparatus 10 adjusts signal levels of the input signal illustrated by the first graph G1 such that the first graph G1 approaches the second graph G2. In FIG. 2, a third graph G3 is an example of the corrected sine wave SIG2. As illustrated in FIG. 2, the signal level adjustment apparatus 10 detects signal levels of the signal illustrated by the first graph G1 and calculates the offset amount and low-frequency components in accordance with the detected signal level to perform the adjustment. That is, by the adjustment, in a predetermined zone such as a "phase detection zone", the signal level adjustment apparatus 10 deletes the low-frequency components and makes the phase closer to the signal illustrated by the second graph G2.

Specifically, the signal level adjustment apparatus 10 detects, in each cycle of the first graph G1, a peak level. Further, as illustrated in FIG. 2, the peak level is a signal level that is highest in a signal level detection zone (±30° from the electric angle of 90°). That is, the peak level is highest in a zone from the electric angle of 60° to the electric angle of 120°. Accordingly, one peak level is detected in one cycle. It should be noted that an average peak level Pa is a signal level obtained by calculating an average or a moving average of a plurality of peak levels detected in respective cycles.

Similarly, the signal level adjustment apparatus 10 detects, in each cycle of the first graph G1, a bottom level. Further, as illustrated in FIG. 2, the bottom level is a signal level that is lowest in a signal detection zone (±30° from the electric angle of 270°). That is, the bottom level is lowest in a zone from the electric angle of 240° to the electric angle of 300°. Accordingly, one bottom level is detected in one cycle. It should be noted that an average bottom level Ba is a signal level obtained by calculating an average or a moving average of a plurality of bottom levels detected in the respective cycles.

A low-frequency component is, for example, a difference PDIF between the average peak level Pa and each peak level. Alternatively, the low-frequency component is a difference BDIF between the average peak level Ba and each bottom level. When either of the low-frequency components is calculated, an offset amount OFS between the first graph G1 and the second graph G2 at the zero cross point ZC is obtained. That is, first, the signal level adjustment apparatus 10 calculates the offset amount OFS at the zero cross point based on either of the low-frequency components. Next, based on the calculated offset amount OFS, the signal level adjustment apparatus 10 performs the in-phase level adjustment in the "phase detection zone" (±30° from the electric angle of 180°) which is the zone from the electric angle of 150° to the electric angle of 210°. In other words, the signal level adjustment apparatus 10 adjusts the levels of the input signal using the offset amount OFS. When the in-phase level adjustment is performed, the signal level adjustment apparatus 10 can make the phase be closer to the second graph G2 at the zero cross point ZC.

The sensor signal may have a phase error at the zero cross point due to variability of magnetic flux density (so-called "magnetization variability"). In FIG. 2, a difference between the first graph G1 at the zero cross point ZC and the second graph G2 is an example of the phase error ERR. On the other hand, when the in-phase level adjustment is performed, because the phase approaches the ideal second graph G2 at the zero cross point ZC, the signal level adjustment apparatus 10 can reduce the phase error ERR.

Further, in a case in which a phase error is present between some sensor signal and an intersecting signal, the signal level of the intersection point may have an error apart from the ideal signal level, which is the so-called "installation phase error". On the other hand, when the phase approaches the ideal second graph G2 at the zero cross point ZC, the signal level adjustment apparatus 10 can reduce the installation phase error.

Further, when the phase approaches the ideal second graph G2 at the zero cross point ZC, the signal level adjustment apparatus 10 can reduce phase errors at points other than the zero cross point ZC.

When the signal level adjustment apparatus 10 can reduce the phase error ERR, accuracy of the phases to be detected can be improved and detection accuracy of the rotation phase of the motor M1 can be increased.

On the other hand, in the zone, from the electric angle of 60° to the electric angle of 120°, where the peak level can be detected and in the zone, from the electric angle of 240° to the electric angle of 300°, where the bottom level can be detected, the third graph G3 is made to be the first graph G1 as illustrated in FIG. 2. This is to detect the peak level and the bottom level that the first graph G1 includes.

<Example of an Overall Process>

Figure 3:
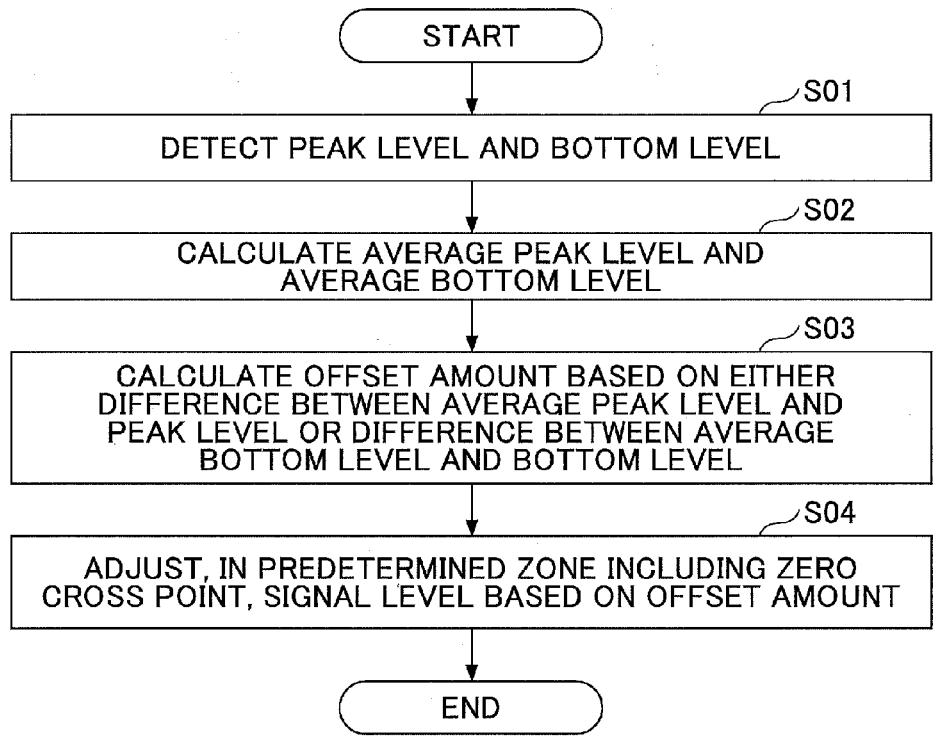
FIG. 3 is a flowchart illustrating an example of an overall process by the signal level adjustment apparatus according to the first embodiment of the present disclosure.

FIG. 3 is a flowchart illustrating an example of an overall process by the signal level adjustment apparatus 10 according to the first embodiment of the present disclosure.

In step S01, the signal level adjustment apparatus 10 detects the plurality of peak levels and the plurality of bottom levels of the input signal. For example, as illustrated in FIG. 2, the signal level adjustment apparatus 10 detects the peak levels in the signal level detection zones (±30° from the electric angle of 90°). Similarly, the signal level adjustment apparatus 10 detects the bottom levels in the signal level detection zones (±30° from the electric angle of 270°).

In step S02, the signal level adjustment apparatus 10 calculates the average peak level and the average bottom level based on the detected plurality of peak levels and the plurality of bottom levels.

In step S03, the signal level adjustment apparatus 10 calculates the offset amount OFS (FIG. 2) based on either a difference between the average peak level and a peak level or a difference between the average bottom level and a bottom level.

In step S04, the signal level adjustment apparatus 10 adjusts, in a predetermined zone including the zero cross point ZC (FIG. 2), signal levels based on the offset amount OFS. It should be noted that the signal level adjustment apparatus 10 may perform the level adjustment one or more times with respect to the input signal including the plurality of cycles.

<Example of a Functional Configuration>

Figure 4:
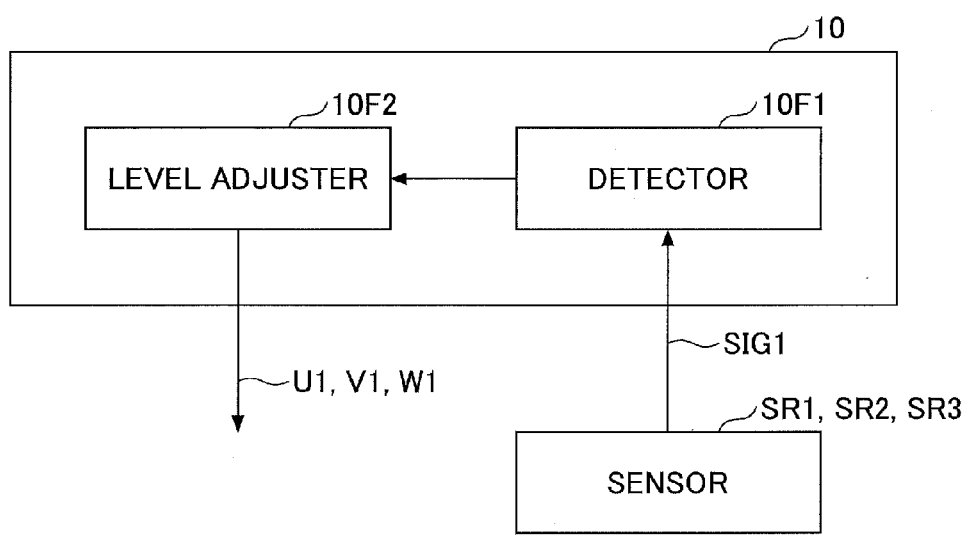
FIG. 4 is a block diagram illustrating an example of a functional configuration of the signal level adjustment apparatus according to the first embodiment of the present disclosure.

FIG. 4 is a block diagram illustrating an example of a functional configuration of the signal level adjustment apparatus 10 according to the first embodiment of the present disclosure. Specifically, the signal level adjustment apparatus 10 includes a detector 10F1 and a level adjuster 10F2.

The detector 10F1 detects the plurality of peak levels and the plurality of bottom levels that the input signal such as the sine wave SIG1 include. Further, based on the plurality of detected peak levels and the plurality of detected bottom levels, the average peak level and the average bottom level are respectively calculated. It should be noted that the detector 10F1 may be implemented by an electric circuit or the like.

Based on the plurality of peak levels and the plurality of bottom levels, detected by the detector 10F1, that the input signal includes, the level adjuster 10F2 performs the level adjustment in the predetermined zone of the input signal. Specifically, as illustrated in FIG. 2, the level adjuster 10F2 performs, in the predetermined zone including the zero cross point, the level adjustment of the signal levels and the like. It should be noted that the level adjuster 10F2 may be implemented by an electric circuit or the like.

Second Embodiment

The signal level adjustment apparatus 10 may have a configuration that adjusts a signal amplification rate. That is, the signal level adjustment apparatus 10 may perform gain adjustment.

Figure 5:
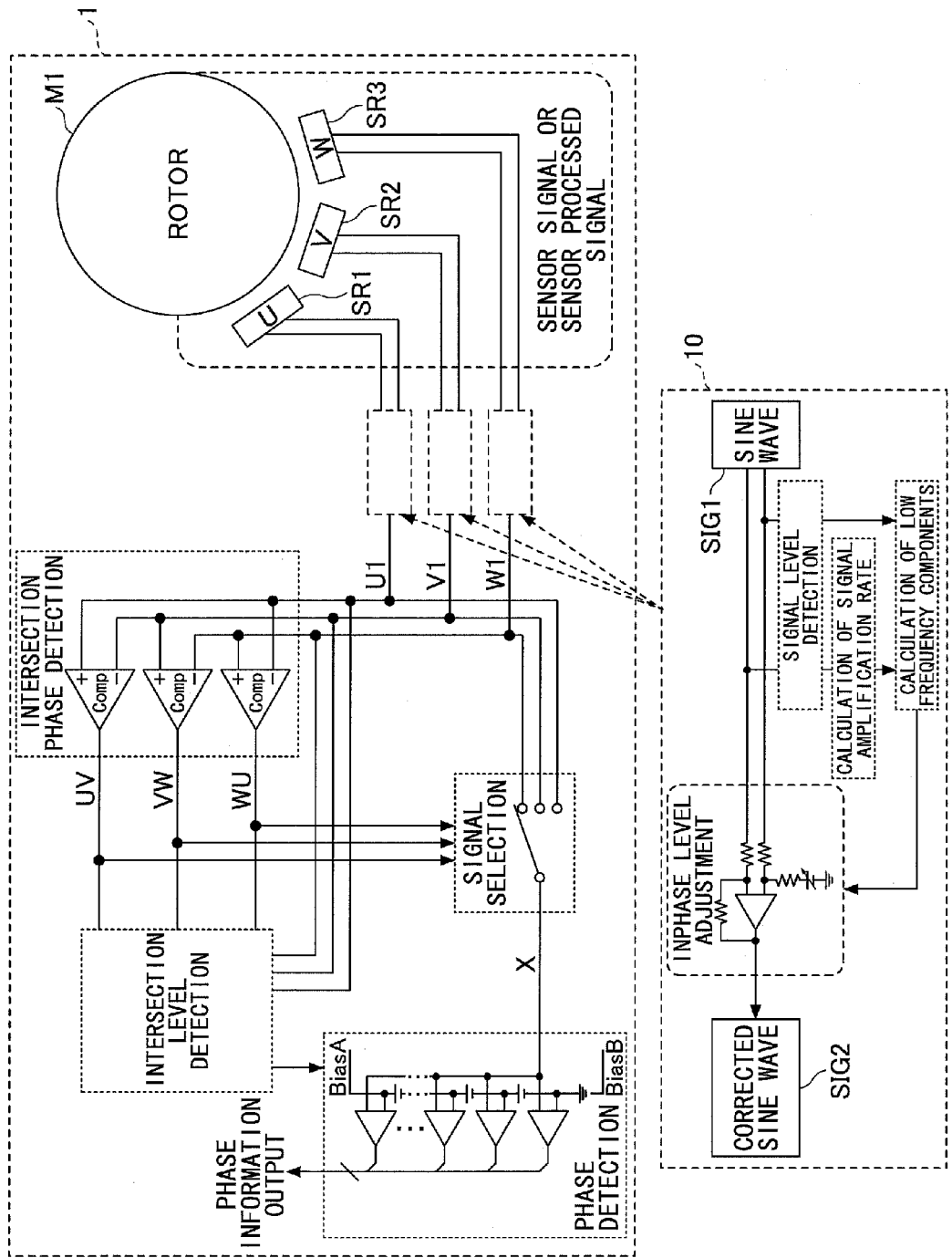
FIG. 5 is a diagram illustrating an example of a configuration of the signal level adjustment apparatus according to a second embodiment of the present disclosure.

FIG. 5 is a diagram illustrating an example of a configuration of the signal level adjustment apparatus 10 according to a second embodiment of the present disclosure. The configuration illustrated in FIG. 5 differs from the configuration illustrated in FIG. 1 in that a configuration (circuit) that calculates a signal amplification rate is added. In the following, difference points will be mainly described.

<Example of Detection and Adjustment>

Figure 6:
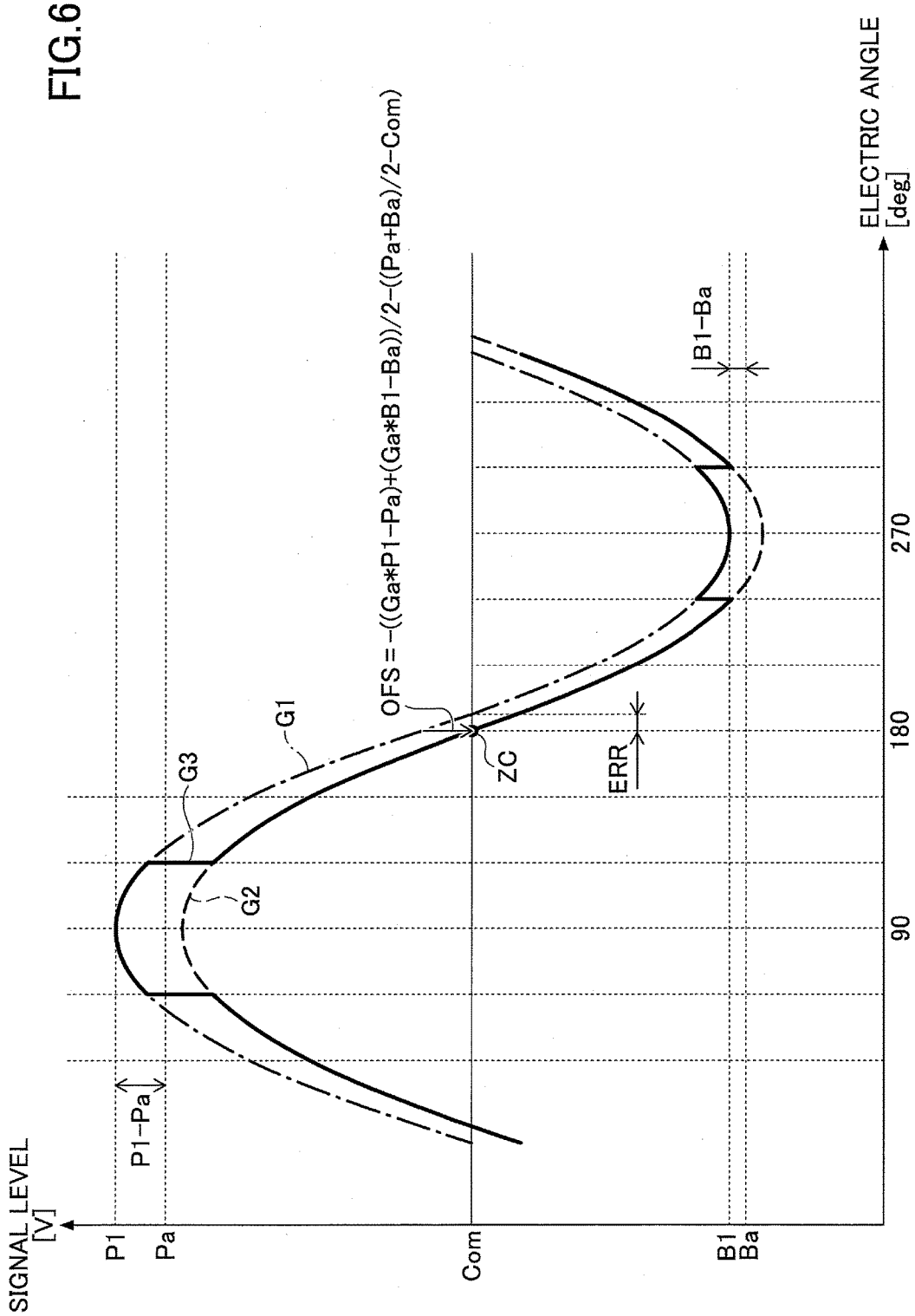
FIG. 6 is a waveform chart illustrating an example of detection and adjustment by the signal level adjustment apparatus according to the second embodiment of the present disclosure.

FIG. 6 is a waveform chart illustrating an example of detection and adjustment by the signal level adjustment apparatus 10 according to the second embodiment of the present disclosure.

The common level Com, the average peak level Pa, and the average bottom level Ba may be calculated by a method similar to that of the first embodiment, for example. Further, in FIG. 6, P1 indicates a peak level in a target cycle and B1 indicates a bottom level in the target cycle.

The signal level adjustment apparatus 10 calculates a signal amplification rate Ga by the following formula (1).

$$Ga=[\{(P1-Pa)-(B1-Ba)\}/2+Pa]/Pa \quad (1)$$

Further, the signal level adjustment apparatus 10 calculates the offset amount OFS by the following formula (2) using the signal amplification rate calculated by the above described formula (1).

$$OFS=-\{(Ga\times P1-Pa)+(Ga\times B1-Ba)\}/2-\{(Pa+Ba)/2-Com\} \quad (2)$$

In the zero cross point ZC, when a difference is present between the phase and the ideal second graph G2, an error may occur as it becomes away from the zero cross point ZC. The signal level adjustment apparatus 10 performs the level adjustment based on the signal amplification rate, calculated by the formula (1), and the offset amount OFS, calculated by the formula (2). When the gain adjustment is performed based on the signal amplification rate Ga, a third graph G3 having a gradient similar to that of the second graph G2 can be generated. Thus, by performing the level adjustment, the signal level adjustment apparatus 10 can reduce the phase errors in points other than the zero cross point. Accordingly, when the signal level adjustment apparatus 10 performs the gain adjustment based on the signal amplification rate Ga and the offset amount OFS, the phase errors in the points other than the zero cross point can be reduced and accuracy of the phases to be detected can be improved. As a result, detection accuracy of the rotation phase of the motor M1 can be increased.

Third Embodiment

The signal level adjustment apparatus 10 may have a configuration that outputs a phase detection signal.

Figure 7:
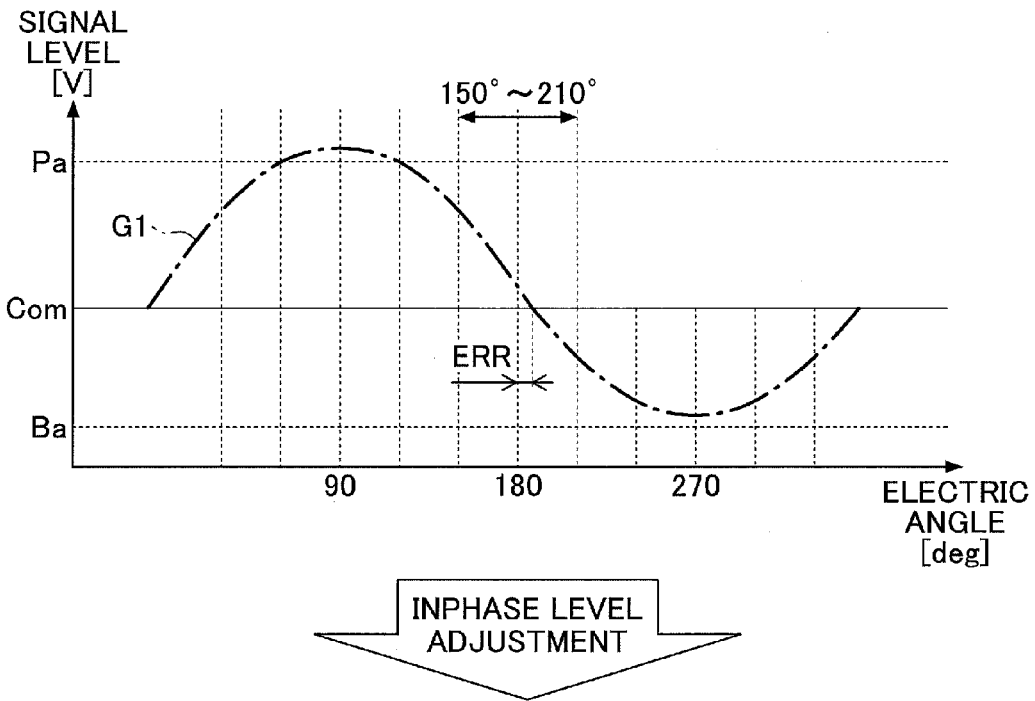
FIG. 7 is a waveform chart illustrating an example of detection and adjustment by the signal level adjustment apparatus according to a third embodiment of the present disclosure.
Figure 7:
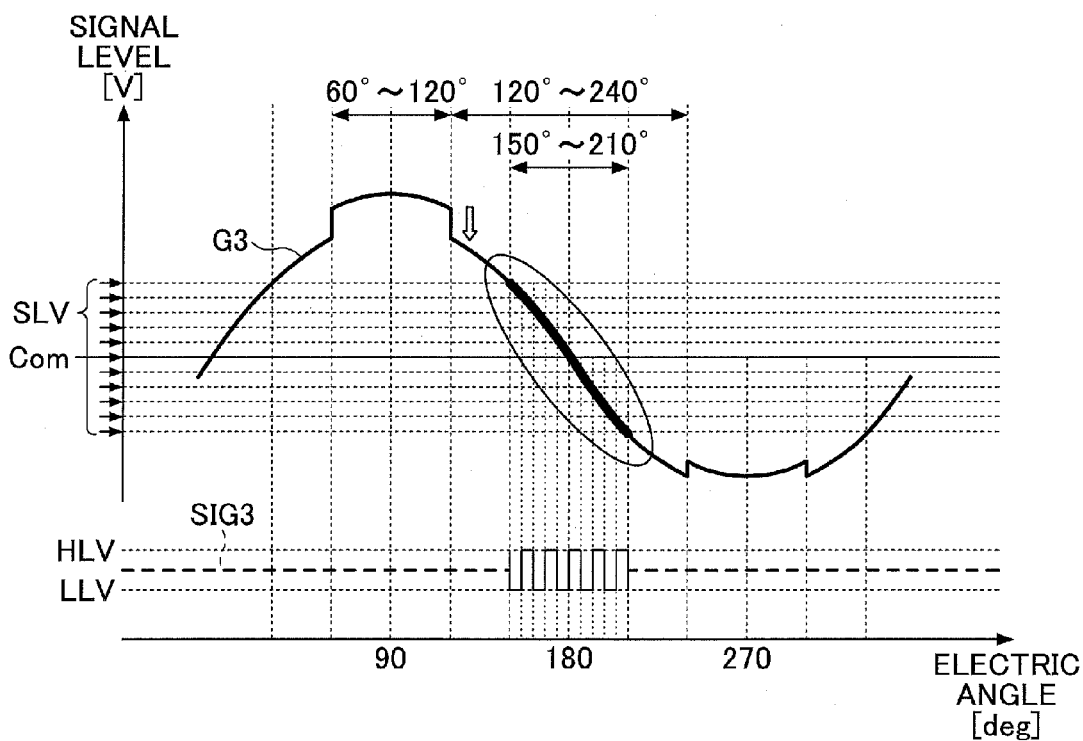

FIG. 7 is a waveform chart illustrating an example of detection and adjustment by the signal level adjustment apparatus 10 according to a third embodiment of the present disclosure. FIG. 7 depicts, for example, a state in which the in-phase level adjustment is performed by a method similar to the in-phase level adjustment of the first embodiment or the second embodiment. That is, FIG. 7 depicts an example in which the level adjustment is performed based on the detected peak levels and the detected bottom levels of the input signal illustrated in the first graph G1, and the signal level adjustment apparatus 10 outputs the output signal illustrated in the third graph G3.

In the third embodiment, the signal level adjustment apparatus 10 outputs a phase detection signal SIG3. Specifically, first, in the third embodiment, slice levels SLV are set in the "phase detection zone", which is the zone between the electric angle of 150° and the electric angle of 210°. For example, in the "phase detection zone", with respect to the third graph G3, 5 slice levels SLV having higher signal levels than the common level COM and 5 slice levels SLV having lower signal levels than the common level COM are set at constant intervals.

The signal level adjustment apparatus 10 uses the respective slice levels SLV as thresholds to switch and output the phase detection signal SIG3 between a high level and a low level. Specifically, as illustrated in FIG. 7, when the signal level of the third graph G3 becomes levels that the respective signal levels SLV represent, the signal level adjustment apparatus 10 switches the phase detection signal SIG3 between the high level HLV and the low level LLV.

For example, when the phase detection signal SIG3 is the high level HLV and the signal level of the third graph G3 becomes the level that the slice level SLV represents, the signal level adjustment apparatus 10 switches the phase detection signal SIG3 to the low level LLV. Next, when the signal level of the third graph G3 becomes the level that the next slice level SLV represents, the signal level adjustment apparatus 10 switches the phase detection signal SIG3 to the high level HLV.

When the level adjustment is performed to make the phase closer to the ideal at the zero cross point ZC by the method according to the first embodiment or the second embodiment, the signal level adjustment apparatus 10 can reduce the phase errors in points other than the zero cross point ZC. Thus, the signal level adjustment apparatus 10 can accurately output the phase detection signal SIG3 that represents that the signal level becomes the corresponding slice level SLV.

<Example of Output by Hall Elements>

Figure 8:
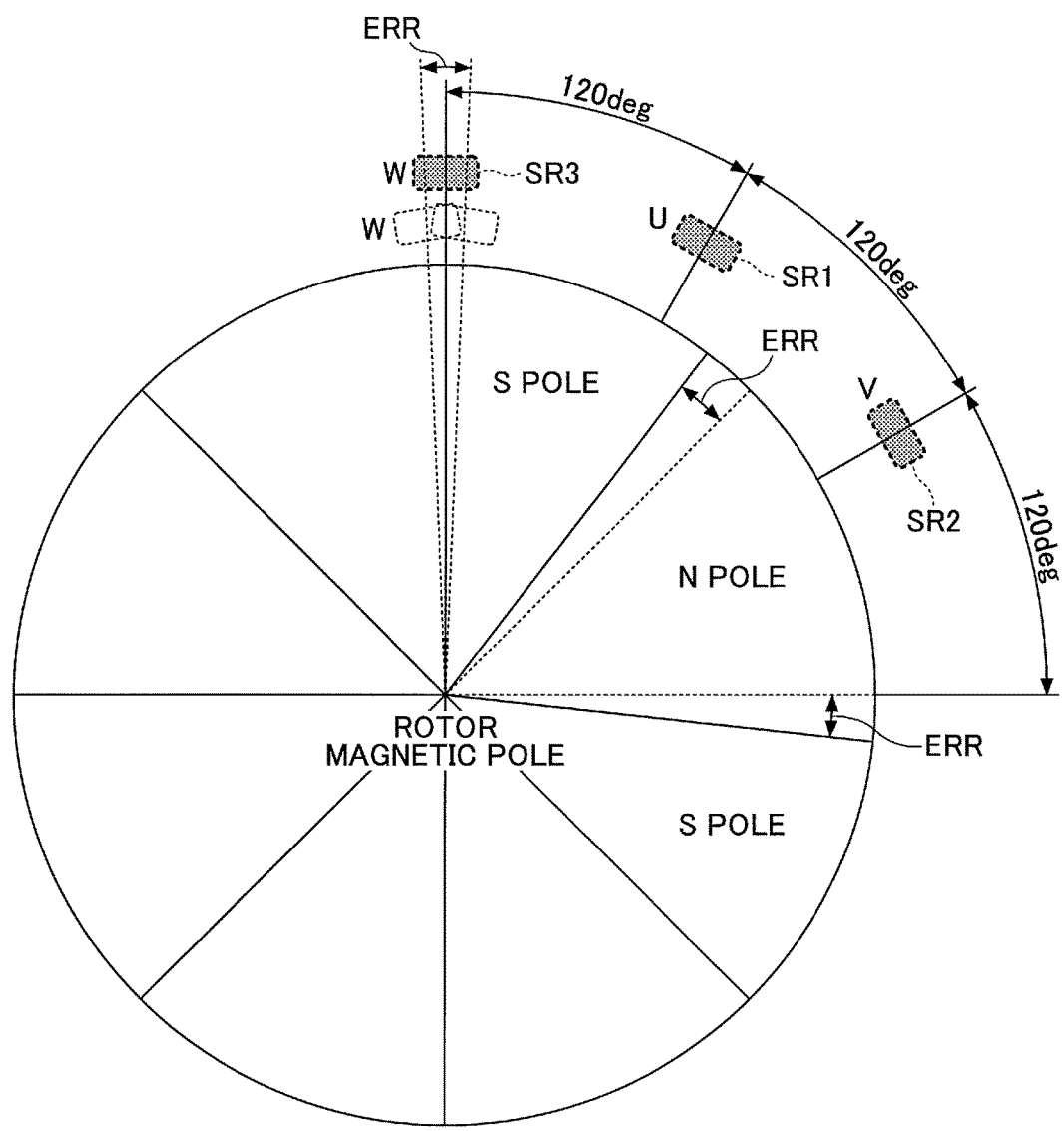
FIG. 8 is a diagram illustrating an example of output by sensors arranged with respect to a motor according to one embodiment of the present disclosure.

FIG. 8 is a diagram illustrating an example of output by the sensors SR1 to SR3 arranged with respect to the motor M1 according to one embodiment of the present disclosure. As illustrated in FIG. 8, the respective sensors SR1 to SR3 are mounted outside of the motor M1, for example. In this case, the phase error may be determined depending on accuracy of mounting the sensors. It should be noted that FIG. 8 depicts an example of an 8-pole inner rotor. That is, in the example illustrated in FIG. 8, when the motor M1 rotates one rotation, 8 magnetic poles are switched.

Further, the electric angle of 360° corresponds to the motor angle of 90°. For example, if the respective Hall elements are arranged for the rotor 20 mm in diameter, the electric angle of 360° corresponds to 15.7 mm (360°=20× π/4=15.7 mm). Thus, the electric angle of 1° corresponds to 43.6 μm. That is, if accuracy of mounting the sensors is equal to or less than 43.6 μm, a phase error is within the electric angle of 1°. However, if the accuracy of mounting the sensors exceeds 43.6 μm, it is often the case that a phase error occurs.

Further, if variation occurs in strength among the magnetic poles, the so-called magnetization variability occurs. When the magnetization variability occurs, the phase error may often occur at a switching point of the North pole and the South pole, which is the zero cross point where the signal level of the sensor signal becomes the common level. Specifically, in a strong magnetic pole, amplitude becomes larger. On the other hand, in a weak magnetic pole, amplitude becomes smaller. These variations of the strength of magnetic poles are input as the low-frequency components and superimposed on the sensor signals. Thus, at the zero cross point, the phase error often occurs. Further, when both a pole having large amplitude and a pole having small amplitude are present, depending on the amplitudes (sizes of the amplitudes), a gradient of the signal level may often vary in comparison with the ideal state.

In a case in which the magnetization variability occurs by one rotation of the rotor magnetic pole, when there is no unbalanced voltage, average amplitude of the input sensor signal may often coincide with amplitude of the ideal sensor signal having no magnetization variability.

The unbalanced voltage is superimposed, as the offset amount, on a voltage that the Hall element outputs and is output. It should be noted that the unbalanced voltage is a voltage that occurs between output terminals in a non-magnetic field. For example, the unbalanced voltage is an offset voltage or a residual voltage that occurs when current or a voltage flows in the Hall element. Further, an unevenness or imbalance of patterns of the Hall element may often cause the unbalanced voltage. That is, when the unbalanced voltage occurs, with respect to the common level, the average peak level and the average bottom level may often have an offset amount on a positive side or a negative side.

According to the present embodiment, the low-frequency components including the unbalanced voltage are calculated to define the offset amount. When the offset amount for the unbalanced voltage is considered (calculated) with respect to the average peak level and the average bottom level, the sensor signal can approach the ideal sensor signal.

It should be noted that coefficients used to calculate the low-frequency components and the signal amplification rate may be set from the outside. Further, although the example is described in which three-phase sensor signals having phase differences of 120° are used, the embodiment is not limited to this. For example, two-phase sensor signals having phase differences of 90° may be used.

<Example of a Process Result>

Figure 9:
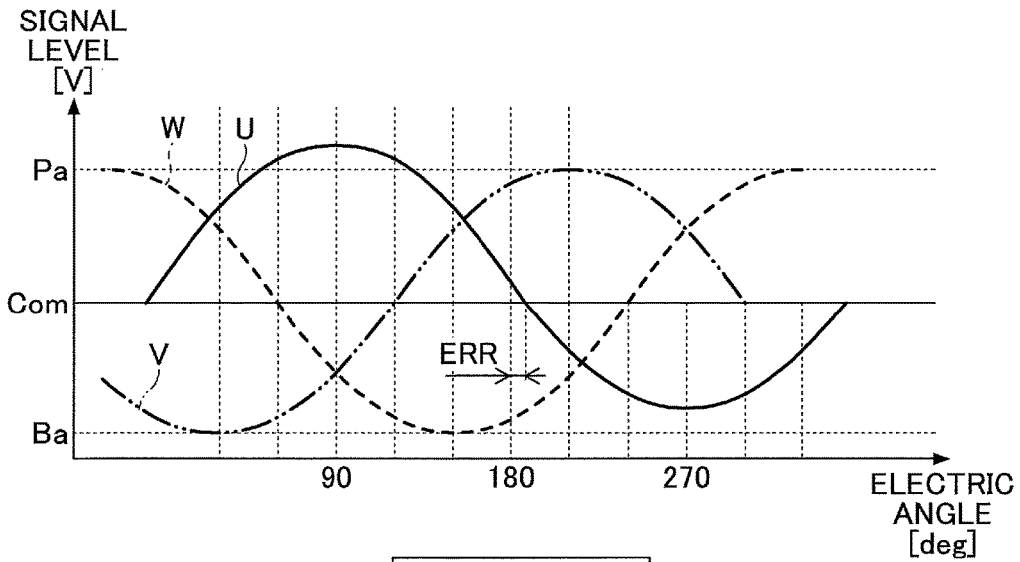
FIG. 9 depicts a waveform chart and a timing chart illustrating an example of a processing result by a motor drive controller and the signal level adjustment apparatus according to one embodiment of the present disclosure.
Figure 9:
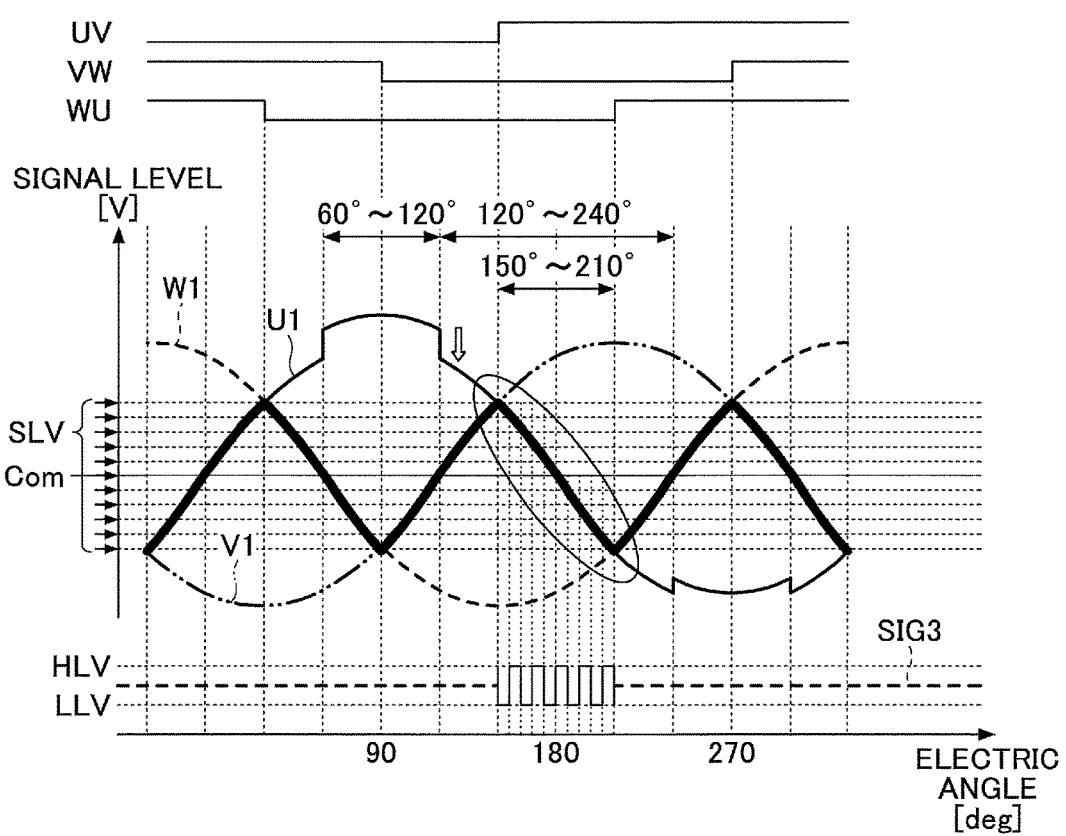

FIG. 9 depicts a waveform chart and a timing chart illustrating an example of a processing result by the motor drive controller 1 and the signal level adjuster 10 according to one embodiment of the present disclosure;

In FIG. 9, U, V, and W represent the sensor signals that the sensors SR1 to SR3 (FIG. 1) output. The signals U, V, and W are input to the signal level adjustment apparatus 10 as the input signals. That is, in FIG. 9, the respective sensor signals U, V, and W represent original waveforms. Further, the sensor signals U, V, and W may include the phase errors ERR. On the other hand, when the in-phase level adjustment is performed by the signal level adjustment apparatus 10, the respective output signals U1, V1, and W1 are generated.

Further, FIG. 9 depicts an example of intersection detection signals UV, VW, and WU. In FIG. 9, if U1>V1, the intersection detection signal UV is set to be the low level. Further, if U1<V1, the intersection detection signal UV is set to be the high level. The intersection detection signals VW and WU are set similarly. It should be noted that although the respective sensor signals U, V, and W are differential signals as illustrated in FIG. 1, in FIG. 9, for the simplification, the sensor signals U, V, and W are set to be signals that represent differences of the respective differential signals.

The selection signal X (FIG. 1) is selected based on the intersection detection signals UV, VW, and WU. For example, if W1<U1<V1 or W1>U1>V1, the output signal U1 is selected. Further, if V1<W1<U1 or V1>W1>U1, the output signal W1 is selected. Moreover, if U1<V1<W1 or U1>V1>W1, the output signal V1 is selected. That is, because sizes of the respective signals can be determined by the intersection detection signals UV, VW, and WU, the motor drive controller 1 can select the selection signal X based on the intersection detection signals UV, VW, and WU.

Further, when the plurality of thresholds in accordance with the rotation position of the motor M1 are set, for example, as the slice levels SLV and the selection signal X becomes any of the slice levels, the motor drive controller 1 outputs a phase signal (phase information) as a motor drive control signal based on the selection signal X.

<Example of the Phase Detection Apparatus>

Figure 10A:
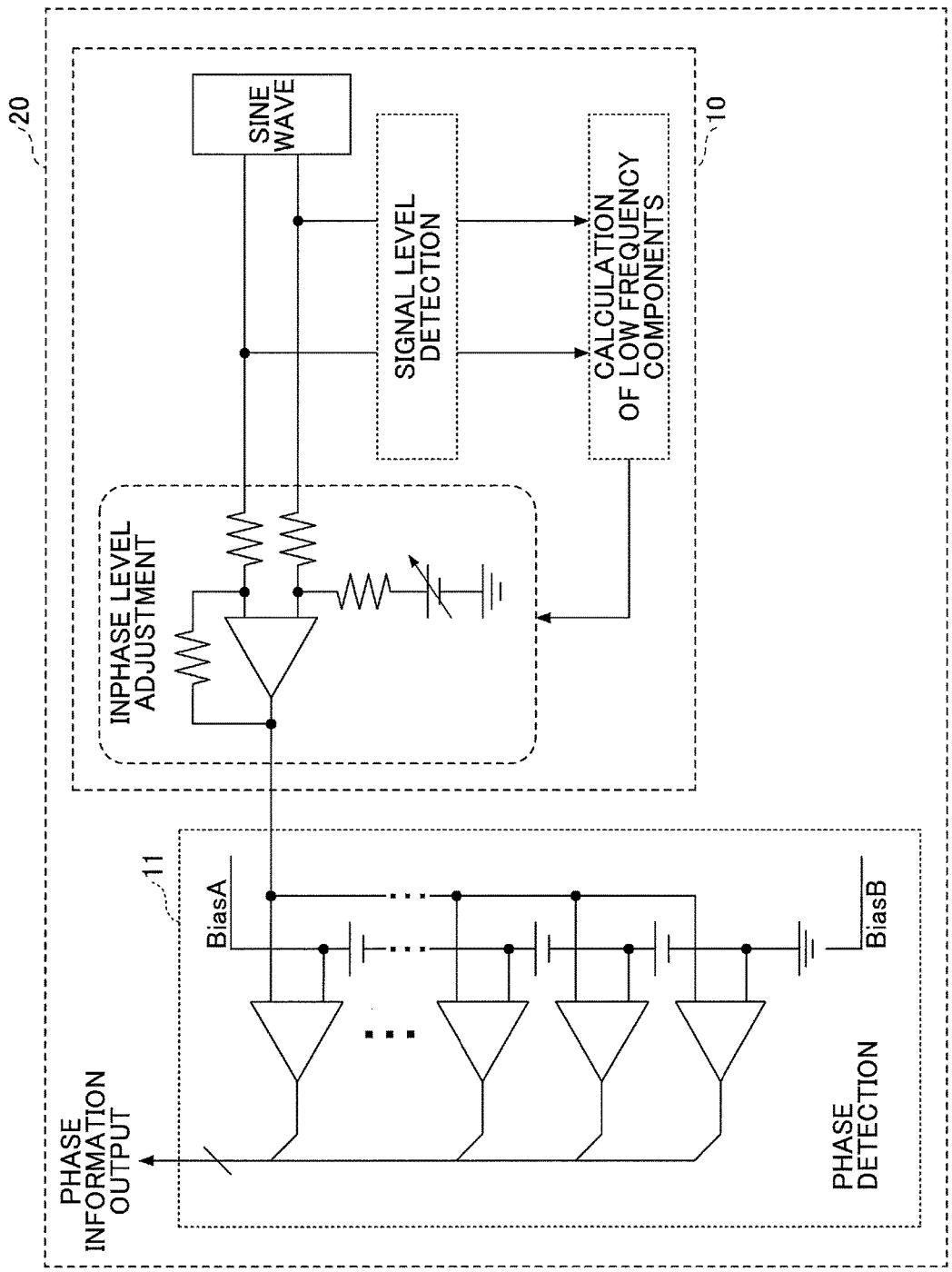
FIGS. 10A and 10B are diagrams illustrating examples of phase detection apparatuses according to one embodiment of the present disclosure.
Figure 10B:
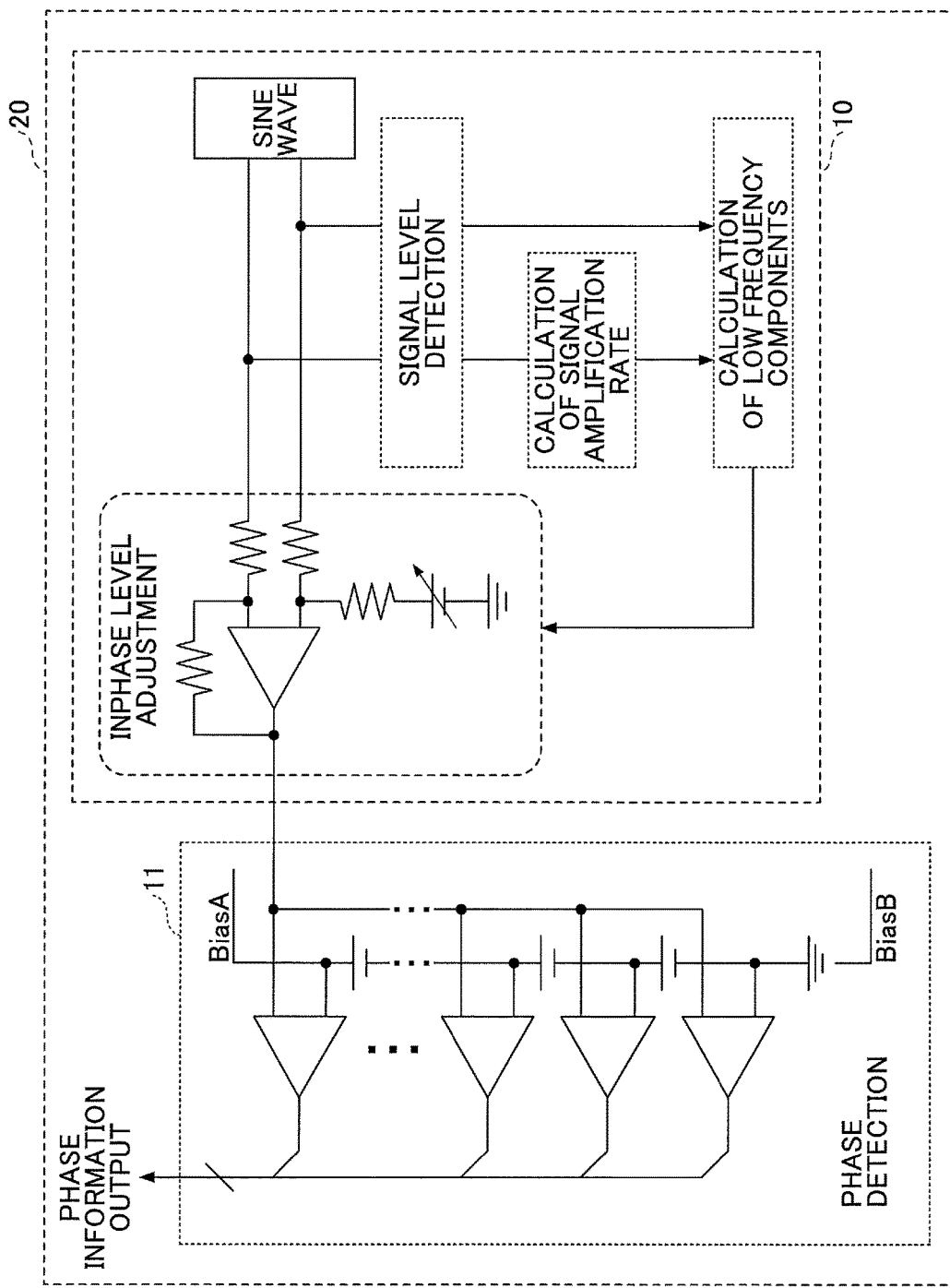

FIGS. 10A and 10B are diagrams illustrating examples of phase detection apparatuses 20 according to one embodiment of the present disclosure. As illustrated in FIG. 10A, the phase detection apparatus 20 includes a phase detector 11 connected to the signal level adjustment apparatus 10. Because the phase detector 11 outputs, as output information, the output signal whose levels are adjusted by the signal level adjustment apparatus 10, a plurality of thresholds are set in the phase detector 11.

Further, as illustrated in FIG. 10B, the phase detection apparatus 20 may include the signal level adjustment apparatus 10 according to the second embodiment that performs the gain adjustment and the phase detector 11.

<Example of the Motor Drive Controller>

Figure 11:
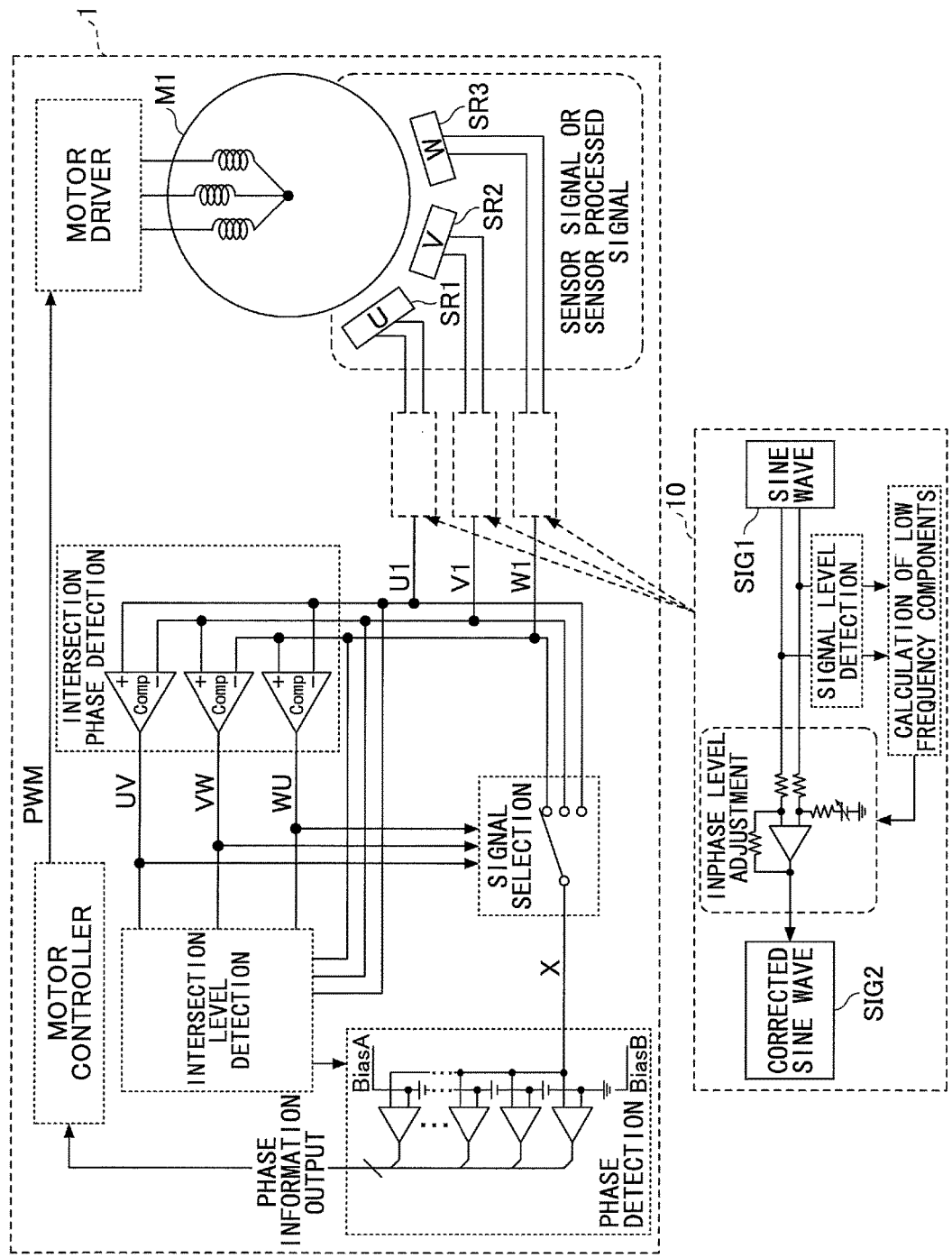
FIG. 11 is a diagram illustrating an example of the motor drive controller according to one embodiment of the present disclosure.

FIG. 11 is a diagram illustrating an example of the motor drive controller 1 according to one embodiment of the present disclosure. The motor drive controller 1 includes a motor controller and the like. For example, in a case in which the signal level adjustment apparatus 10 illustrated in FIG. 1 is used, the output signal that the signal level adjustment apparatus 10 outputs is output to the motor controller as the phase information by the phase detector. Next, the motor controller detects a position, a speed, and the like based on the phase information to control the motor M1. The control of the motor M1 may be implemented, for example, by outputting Pulse Width Modulation (PWM) signals to a motor driver.

<Example of a Conveyor>

Figure 12:
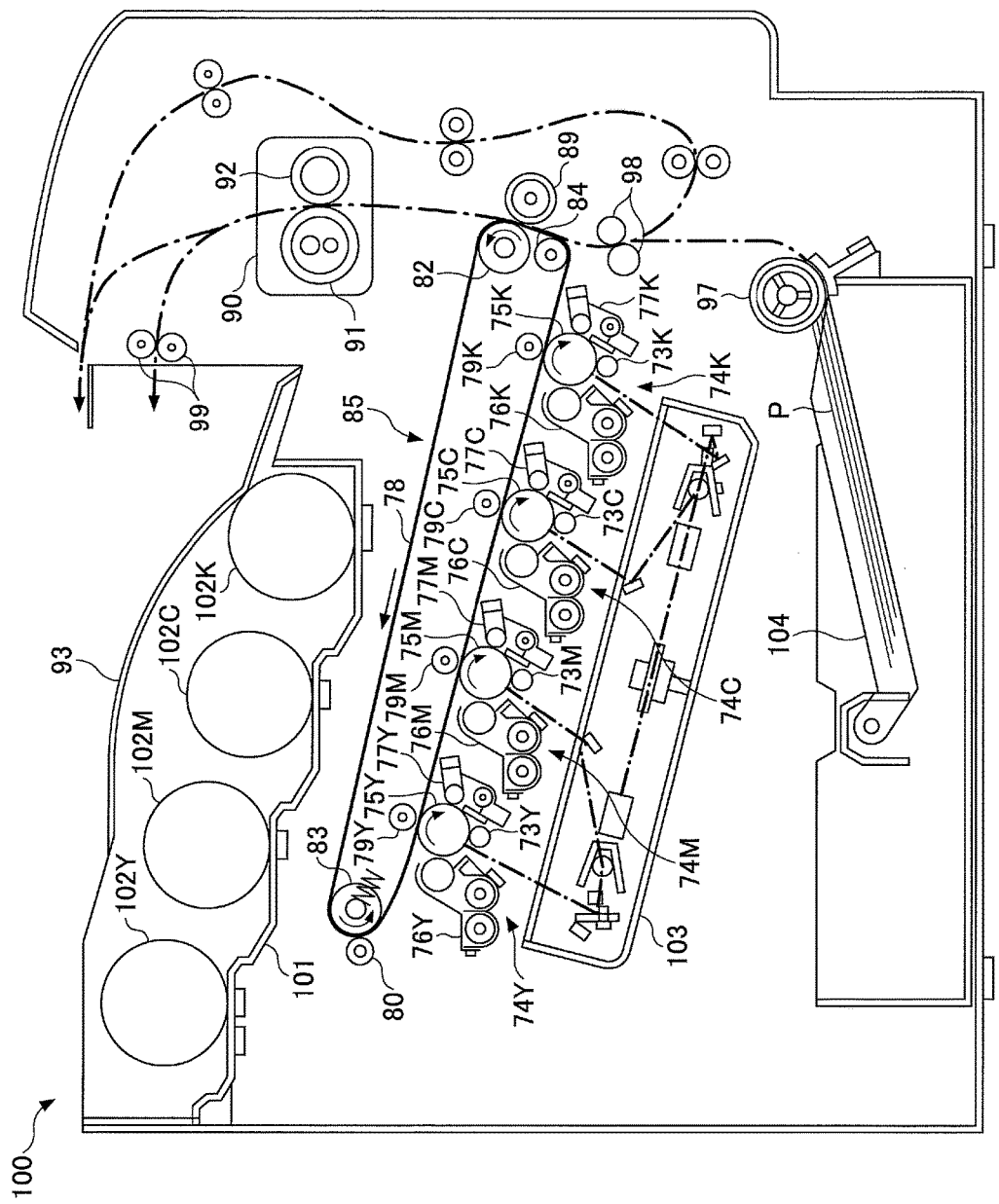
FIG. 12 is a cross-sectional view of an example of an image forming apparatus including a conveyor according to one embodiment of the present disclosure.

FIG. 12 is a cross-sectional view of an example of an image forming apparatus 100 including a conveyor according to one embodiment of the present disclosure. FIG. 12 illustrates the image forming apparatus 100 to which the motor drive controller 1 according to one embodiment of the present invention is applicable as the conveyor. The image forming apparatus 100 illustrated in FIG. 12 is a tandem-type color printer. On a bottle housing unit 101 provided in the upper part of the main body of the image forming apparatus 100, four toner bottles 102Y, 102M, 102C, and 102K for respective colors (yellow, magenta, cyan, and black) are removably (replaceably) installed.

Below the bottle housing unit 101, an intermediate transfer unit 85 is provided, in which an intermediate transfer belt 78 is included. Image forming units 74Y, 74M, 74C, and 74K corresponding to respective colors (yellow, magenta, cyan, and black) are provided side by side, so as to face the intermediate transfer belt 78.

In the image forming units 74Y, 74M, 74C, and 74K, photosensitive drums 75Y, 75M, 75C, and 75K are respectively provided. In the surrounding areas of the photosensitive drums 75Y, 75M, 75C, and 75K, charging units 73Y, 73M, 73C, and 73K, developing units 76Y, 76M, 7C, and 76K, cleaning units 77Y, 77M, 77C, and 77K, and neutralization units are respectively provided. At the photosensitive drums 75Y, 75M, 75C, and 75K, an image forming process (including a charging process, an exposing process, a developing process, a transfer process, and a cleaning process) is performed, whereby images of respective colors are formed on the photosensitive drums 75Y, 75M, 75C, and 75K.

The photosensitive drums 75Y, 75M, 75C, and 75K are driven to rotate by a drive motor clockwise. At the positions of the charging units 73, the surfaces of the photosensitive drums 75Y, 75M, 75C, and 75K are uniformly charged (an example of the charging process).

After the charging process, the surfaces of the photosensitive drums 75Y, 75M, 75C, and 75K reach the irradiation positions of laser light emitted from an exposing unit 103. Electrostatic latent images are formed by exposure scanning at the positions on the surfaces of the photosensitive drums 75Y, 75M, 75C, and 75K (an example of the exposing process).

After the exposing process, the surfaces of the photosensitive drums 75Y, 75M, 75C, and 75K reach the respective positions facing the developing units 76. Electrostatic latent images are developed at the positions, whereby the toner images of respective colors are formed thereon (an example of the developing process).

After the developing process, the surfaces of the photosensitive drums 75Y, 75M, 75C, and 75K reach the respective positions facing the intermediate transfer belt 78 and first transfer bias rollers 79Y, 79M, 79C, and 79K. The toner images on the photosensitive drums 75Y, 75M, 75C, and 75K are transferred onto the intermediate transfer belt 78 at the respective positions (an example of the primary transfer process). On this occasion, a small amount of not-transferred toner may remain on the photosensitive drums 75Y, 75M, 75C, and 75K.

After the primary transfer process, the surfaces of the photosensitive drums 75Y, 75M, 75C, and 75K reach the respective positions facing the cleaning units 77. The not-transferred toner remaining on the photosensitive drums 75Y, 75M, 75C, and 75 is mechanically collected by cleaning blades of the cleaning units 77 (an example of the cleaning process).

Next, the surfaces of the photosensitive drums 75Y, 75M, 75C, and 75K reach the respective positions facing the neutralization units. Residual potentials on the photosensitive drums 75Y, 75M, 75C, and 75K are removed at the positions. In this way, a series of image forming processes performed on the photosensitive drums 75Y, 75M, 75C, and 75K ends.

A recording medium P has been conveyed from a paper feeding unit 104 provided on the lower part of the image forming apparatus 100 via a paper feeding roller 97 and a pair of registration rollers and then conveyed to the position of a secondary transfer nip.

More specifically, a plurality of recording media P such as transfer sheets are stored in a stacked manner in the paper feeding unit 104. When the paper feeding roller 97 is driven to rotate counterclockwise in FIG. 12, the top sheet of the recording media P stacked in the paper feeding unit 104 is fed toward a gap between the pair of registration rollers 98.

The recording medium P conveyed to the pair of registration rollers 98 temporarily stops at the position of the nip of the pair of registration rollers 98 because the pair of registration rollers has stopped rotating. Subsequently, the pair of registration rollers 98 is driven to rotate synchronously with the color image on the intermediate transfer belt 78. In this way, the color image is transferred onto the recording medium P.

After that, the recording medium P, onto which the color image has been transferred at the position of the secondary transfer nip, is conveyed to the position of a fixing unit 90. The color image transferred on the surface of the recording medium P is then fixed thereon by heat and pressure generated between a fixing roller 91 and a pressing roller 92.

Subsequently, the recording medium P is ejected to the outside of the apparatus through the gap between a pair of ejecting rollers 99. The transferred recording medium P ejected by the pair of ejecting rollers 99 to the outside of the apparatus is then stacked on a stacking unit 93. In this way, a series of image forming processes in the image forming apparatus 100 is completed.

The motor M1 controlled by the motor drive controller 1 according to the embodiment can be used to provide the power to drive the above-described pair of registration rollers 98. For example, when the recording medium P is temporarily stopped at the position of the nip of the pair of registration rollers 98, the motor drive mode of the motor M1 is set to a position holding mode. By stopping the drive rotation of the motor M1 in the position holding mode, the rotational position of the motor M1, that is, the rotational position of the pair of registration rollers 98 is held, whereby the position of the recording medium P is held.

According to the embodiment, while the position of the recording medium P is held in the position holding state, the motor M1 is controlled to reverse the rotational direction for each driving period of the motor M1. The count value for detecting the lock state is therefore reset for each driving period, thus the count value does not exceed the threshold. As a result, even if the stopped state of the recording medium P continues for a long time, an erroneous detection of the lock state can be avoided.

An application target of the motor M1 controlled by the motor drive controller 1 according to the embodiment is not limited to the driving source of the pair of registration rollers 98. The motor M1 may be applied to other power sources that need drive control to hold the position in the image forming apparatus 100.

Further, the present invention is not limited to these embodiments, but various variations and modifications may be made without departing from the scope of the present invention.

The present application is based on and claims the benefit of priority of Japanese Priority Application No. 2015-123234 filed on Jun. 18, 2015, with the Japanese Patent Office, the entire contents of which are hereby incorporated by reference.

What is claimed is:

1. A signal level adjustment apparatus for controlling a motor coupled to the signal level adjustment apparatus, the signal level adjustment apparatus comprising:
 a circuit configured to
  detect both a plurality of peak levels of an input signal having a sinusoidal waveform or a substantially sinusoidal waveform and a plurality of bottom levels of the input signal, the detector detecting, in respective cycles from 0° to 360° of the input signal, the plurality of peak levels between 60° and 120° and the plurality of bottom levels between 240° and 300°;
  adjust, based on a difference between an average peak level of the plurality of peak levels and a peak level that the input signal includes and/or a difference between an average bottom level of the plurality of bottom levels and a bottom level that the input signal includes, a level of the input signal so that the level of the input signal approaches, at 180°, a zero cross point; and
  output a signal having the adjusted level, wherein the input signal having the substantially sinusoidal waveform includes frequency components lower than the sinusoidal waveform.

2. The signal level adjustment apparatus according to claim 1, wherein the zero cross point is in a zone at which the input signal becomes a common level.

3. The signal level adjustment apparatus according to claim 2, wherein the circuit of the signal level adjuster is configured to use an offset amount, obtained based on either of a difference between an average peak level calculated based on the plurality of peak levels and a peak level that the input signal includes or a difference between an average bottom level calculated based on the plurality of bottom levels and a bottom level that the input signal includes, to adjust the levels of the input signal.

4. The signal level adjuster according to claim 1, wherein the circuit of the signal level adjuster is configured to use an offset amount, obtained based on either of a difference between an average peak level calculated based on the plurality of peak levels and a peak level that the input signal includes or a difference between an average bottom level calculated based on the plurality of bottom levels and a bottom level that the input signal includes, to adjust the levels of the input signal.

5. The signal level adjustment apparatus according to claim 1, wherein the circuit of the signal level adjuster is configured to perform a gain adjustment.

6. The signal level adjustment apparatus according to claim 5, wherein a signal amplification rate, calculated based on a difference between an average peak level calculated based on the plurality of peak levels and a peak level that the input signal includes, a difference between an average bottom level calculated based on the plurality of bottom levels and a bottom level that the input signal includes, and the average peak level, is used to perform the gain adjustment.

7. A phase detection apparatus comprising the signal level adjustment apparatus according to claim 1.

8. A motor drive controller comprising the phase detection apparatus according to claim 7.

9. A conveyer comprising the motor drive controller according to claim 8.

10. An image forming apparatus comprising the motor drive controller according to claim 8.

11. A signal level adjustment method for controlling a motor coupled to the signal level adjustment apparatus, the method comprising:
    detecting both a plurality of peak levels of an input signal having a sinusoidal waveform or a substantially sinusoidal waveform and a plurality of bottom levels of the input signal, and detecting, in respective cycles from 0° to 360° of the input signal, the plurality of peak levels between 60° and 120° and the plurality of bottom levels between 240° and 300°;
    adjusting, based on a difference between an average peak level of the plurality of peak levels and a peak level that the input signal includes and/or a difference between an average bottom level of the plurality of bottom levels and a bottom level that the input signal includes, a level of the input signal so that the level of the input signal approaches, at 180°, a zero cross point; and
    outputting a signal having the adjusted level, wherein the input signal having the substantially sinusoidal waveform includes frequency components lower than the sinusoidal waveform.

12. The method according to claim 11, wherein the zero cross point is in a zone at which the input signal becomes a common level.

13. The signal level adjustment method according to claim 11, adjusting the levels of the input signal using an offset amount, obtained based on either of a difference between an average peak level calculated based on the plurality of peak levels and a peak level that the input signal includes or a difference between an average bottom level calculated based on the plurality of bottom levels and a bottom level that the input signal includes.

14. The signal level adjustment method according to claim 11, adjusting the levels of the input signal using an offset amount, obtained based on either of a difference between an average peak level calculated based on the plurality of peak levels and a peak level that the input signal includes or a difference between an average bottom level calculated based on the plurality of bottom levels and a bottom level that the input signal includes, to adjust the levels of the input signal.

15. The signal level adjustment method according to claim 11, further comprising performing a gain adjustment.

16. The signal level adjustment method according to claim 15, wherein the gain adjustment is performed based on a signal amplification rate, calculated based on a difference between an average peak level calculated based on the plurality of peak levels and a peak level that the input signal includes, a difference between an average bottom level calculated based on the plurality of bottom levels and a bottom level that the input signal includes, and the average peak level.

* * * * *